United States Patent [19]
Watkins, Jr.

[11] Patent Number: 5,201,138
[45] Date of Patent: Apr. 13, 1993

[54] BUBBLING FISH ATTRACTOR

[76] Inventor: Hugh E. Watkins, Jr., 4253 Pinetree La., Cincinnati, Ohio 45245

[21] Appl. No.: 882,882

[22] Filed: May 14, 1992

[51] Int. Cl.⁵ .............................................. A01K 85/01
[52] U.S. Cl. ................................. 43/42.06; 43/42.37
[58] Field of Search ............... 43/42.06, 42.37, 42.38, 43/44.89, 44.99, 41, 42.05, 42.36

[56] References Cited

U.S. PATENT DOCUMENTS

| | | | |
|---|---|---|---|
| 2,827,376 | 3/1958 | Breuer | 43/42.06 |
| 3,410,689 | 11/1968 | Nathan | 43/42.06 |
| 3,605,316 | 9/1971 | Rogers | 43/42.06 |
| 3,688,430 | 9/1972 | Balch | 43/42.06 |
| 3,971,152 | 7/1976 | Husson, Jr. | 43/42.06 |
| 4,050,181 | 9/1977 | Young et al. | 43/42.06 |
| 4,189,860 | 2/1980 | Ebert | 43/42.29 |
| 4,538,374 | 9/1985 | Louthan | 43/44.97 |
| 4,663,881 | 5/1987 | Follett | 43/43.12 |
| 4,664,857 | 5/1987 | Nambu | 264/28 |
| 4,710,385 | 12/1987 | Vickers | 426/1 |
| 4,732,766 | 3/1988 | Lindgard | 426/1 |
| 4,883,620 | 11/1989 | Follett | 264/72 |
| 4,910,908 | 3/1990 | Rosenburg | 43/44.89 |

*Primary Examiner*—Richard K. Seidel
*Assistant Examiner*—Jeanne M. Elpel
*Attorney, Agent, or Firm*—Steven J. Rosen

[57] ABSTRACT

The present invention provides a fish attractor which bubbles underwater and is made from a material which provides an effervescing reaction when brought into contact with water. The effervescing reactant is contained in a relatively soft waterproof shell that is malleable and that may be pierced so that it may be impaled on the shank of a fishing hook. The malleable shell also allows the shell to be easily pierced with holes that are useful to control the amount of water getting into the shell and hence control the rate of bubbling. The preferred embodiment provides a soft wax shell surrounding a core made of an effervescing reactant comprising 50% sodium bicarbonate (baking soda) and anhydrous citric acid with an anti-caking agent added such as 1% by weight sodium hexametaphosphate.

14 Claims, 1 Drawing Sheet

BUBBLING FISH ATTRACTOR

BACKGROUND OF THE INVENTION

1. Field of the Invention

The invention relates to attracting fish for fishing, and particularly for a merchantable device for creating bubbles under water at a controllable rate and that can be attached to a fishing hook and that is easy to package, store, and sell.

2. Description of Related Art

Fisherman and the industry that serves them seem to have always searched for a better fish attractor. Among the desirable type of fish attractors are those which produce a bubbling action under water to attract the fish to the fisherman's line, bait, and hook. One such device is disclosed in U.S. Pat. No. 4,910,908, entitled "Water Soluble Fishing Line Weight" by Alan I. Rosenberg, and which issued Mar. 27, 1990. The Rosenberg device is a water soluble fishing line weight made with baking soda and other materials into a cheese like moldable material that will fall of the line.

The problem with such a device is that the weight falls away from the hook and the fish are not attracted close to the hook and bait and a new weight must be used on each cast. Furthermore, the material is made from corn sweetener which is not easily handled because it is messy and sticky and does not have a long shelf life which therefore detracts from its commercially feasibility. It also dissolves quickly in an uncontrolled manner and therefore has a very limited useful bubbling life span.

There is a need for a bubbling fish attractor that may be cast out and used several times, have a long bubbling period, dissolve slowly and in a controlled manner, and that is easy to use. There is a further need that it be commercially feasible, be easy to make and distribute, and have a relatively long shelf life. To this end the present invention is directed.

SUMMARY OF THE INVENTION

The present invention provides a fish attractor which bubbles underwater and is made from a material which provides an effervescing reaction when brought into contact with water. The material referred to as an effervescing reactant is contained in a relatively soft waterproof shell that is at once malleable and may be easily pierced so that it may be attached to a fishing line preferably on the shank of the hook. The malleability feature allows the shell to be pierced in order to provide holes which are used to control the amount of water getting through the shell and into its core containing the effervescing reactant and hence control the amount of bubbling.

The preferred embodiment provides a sealed wax shell in the form of a ball having about a one half inch diameter and a core filled with an effervescing reactant comprising a mixture of ½ sodium bicarbonate and ½ anhydrous citric acid, with an additional 1 percent by weight sodium hexametaphosphate, an anti-caking agent. The wax ball is preferably a soft refined wax, which can be impaled on the fishing hook prior to the placing of the users selected live or artificial bait. After the fish attractor is placed on the hook, a number of small holes, two is thought to be a good number, are punched into each side of the wax ball with a sharp pointed object. This exposes the effervescing reactant mixture to the water when the hook is placed into the water and the mixture reacts with the water, producing environmentally safe bubbles. The fish see the bubbles and are attracted towards the hook and bait.

ADVANTAGES

Among the advantages provided by the present invention are ease of use, safety, and relative tidiness and neatness as compared to previous underwater bubbling devices. The present invention allows the rate of underwater bubbling to be controlled and for the bubbling action to last longer and even be used more than once provided all the effervescing material has not been used up. The present invention is very merchantable because of its ease of storage and transport to areas in varying environments such as in hot weather. The present invention is safe, extremely stable, easy, inexpensive to construct, easy to use and store and has a relatively long shelf life. The invention is also environmentally safe and will not pollute.

BRIEF DESCRIPTION OF THE DRAWING

The foregoing aspects and other features of the invention are explained in the following description, taken in connection with the accompanying drawing where.

DETAILED DESCRIPTION OF THE INVENTION

Figure 1:
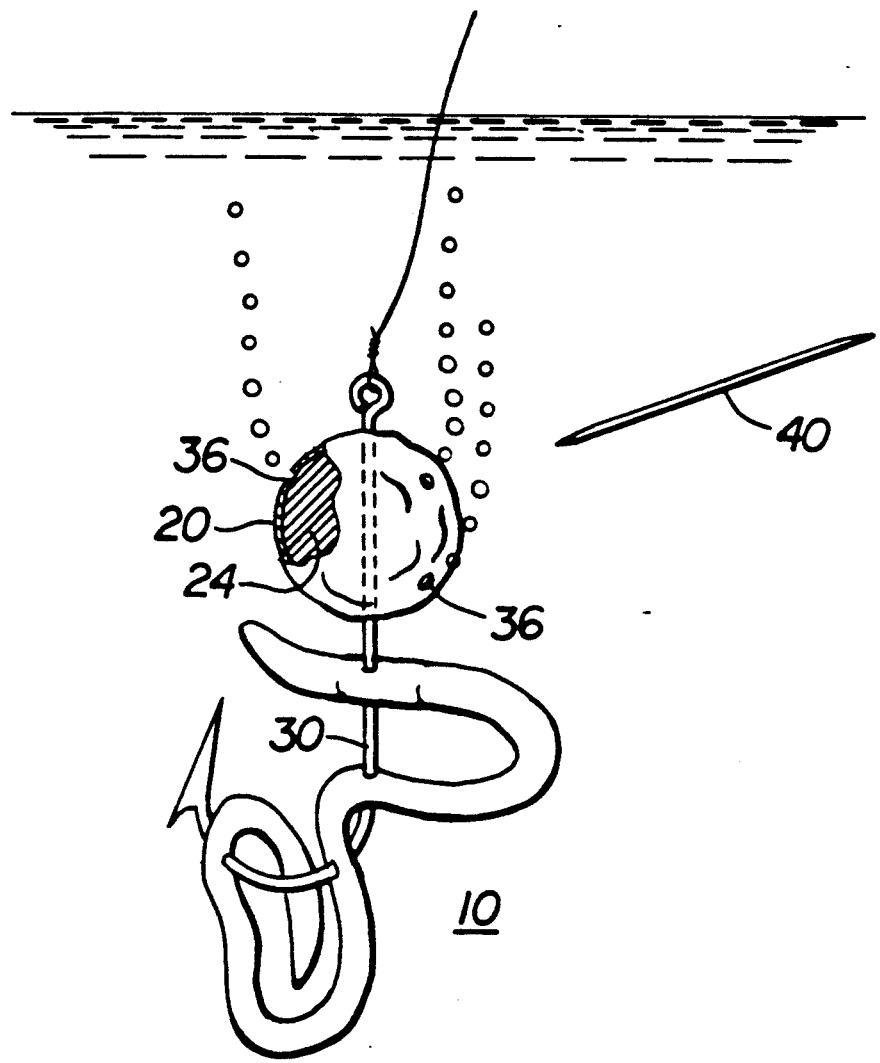
FIG. 1 is a diagrammatic perspective view of a bubbling fish attractor in accordance with one embodiment of the present invention.

Illustrated in FIG. 1 is the preferred embodiment of the present invention which provides a fish attractor 10 which creates bubbles 14 underwater and is made from a water reacting effervescing reactant 18 which provides an effervescing reaction when brought into contact with water. The effervescing reactant 18 is contained in a core 24 in a relatively soft waterproof shell 20 that is at once malleable and may be easily pierced so that it may be attached to a fishing line 26 preferably on the shank 30 of a fishing hook 32. The malleability property of shell 20 also allows it to be pierced by a pin 40 or other sharp object such as another fishing hook in order to provide holes 36 in the shell 20 which provides a means to control the amount of water getting into the shell 20 and hence control the amount of bubbling.

The preferred embodiment provides a sealed wax shell 20 in the form of a ball having about a one half inch diameter and filled with an effervescing reactant comprising a mixture of about 50% sodium bicarbonate and about 50% anhydrous citric acid. Preferably an anti-caking agent such as sodium hexametaphosphate is added in the amount of 1% by weight. The anti-caking agent helps prolong the useful shelf life of the fish attractor 10 and helps make it reusable by the fisherman. The sodium bicarbonate provides an excellent environmentally soft effervescing reactant which is safe to use and provides very good bubbling action at various water temperatures. The wax shell 20 is preferably made of a soft refined wax, which can be impaled on the hook 32 prior to the placing of the users selected live or artificial bait 44.

In use, the fish attractor 10 is placed on the hook 32 and a number of small holes 36, two is thought to be a good number, are punched into each side of the wax shell 20 with a pin 40 or other sharp object. This exposes the effervescing reactant mixture 18 contained in the core 24 to the water when the hook is placed into the water and the mixture 18 reacts with the water thereby producing environmentally safe bubbles. The fish see the bubbles and are attracted towards the hook 32 and bait 44.

While the preferred embodiment of our invention has been described fully in order to explain its principles, it is understood that various modifications or alterations may be made to the preferred embodiment without departing from the scope of the invention as set forth in the appended claims.

I claim:

1. A fish attracting device comprising:
  a malleable waterproof shell that is capable of being pierced to form apertures through said shell,
  a core within said shell, and
  said core containing an effervescing reactant capable of producing bubbles when placed underwater.

2. A fish attracting device as claimed in claim 1 wherein said shell is made of a soft wax.

3. A fish attracting device as claimed in claim 2 wherein said effervescing reactant includes sodium bicarbonate.

4. A fish attracting device comprising:
  a malleable waterproof shell,
  a core within said shell,
  said core containing an effervescing reactant including sodium bicarbonate capable of producing bubbles when placed underwater, and
  said core further including an anti-caking agent.

5. A fish attracting device as claimed in claim 4 wherein said anti-caking agent includes sodium hexametaphosphate in an amount that is 1% by weight.

6. A fish attracting device as claimed in claim 5 wherein said core includes a mixture comprising about 50% sodium bicarbonate and about 50% anhydrous citric acid.

7. A fist attracting device as claimed in claim 4 wherein said anti-caking agent includes sodium hexametaphosphate in an amount that is 1% by weight.

8. A fist attracting device as claimed in claim 5 wherein said core includes a mixture comprising about 50% sodium bicarbonate and about 50% anhydrous citric acid.

9. A fish attracting device comprising:
  a fishing hook,
  a malleable waterproof shell that is capable of being pierced to form apertures through said shell and is impaled on said fishing hook,
  a core within said shell, and
  said core containing an effervescing reactant capable of producing bubbles when placed underwater.

10. A fish attracting device as claimed in claim 9 wherein said shell is made of a soft wax.

11. A fish attracting device as claimed in claim 10 wherein said effervescing reactant includes sodium bicarbonate.

12. A fish attracting device comprising:
  a fishing hook,
  a malleable soft wax waterproof shell impaled on said fishing hook,
  a core within said shell,
  said core including an effervescing reactant including sodium bicarbonate and capable of producing bubbles when placed underwater and said core further including an anti-caking agent.

13. A fish attracting device as claimed in claim 12 wherein said anti-caking agent includes sodium hexametaphosphate in an amount that is 1% by weight.

14. A fish attracting device as claimed in claim 13 wherein said core includes a mixture comprising about 50% sodium bicarbonate and about 50% anhydrous citric acid.

* * * * *